United States Patent
Tan et al.

(10) Patent No.: US 8,490,876 B2
(45) Date of Patent: Jul. 23, 2013

(54) METHOD AND APPARATUS FOR TESTING THE PERFORMANCE OF RADIO FREQUENCY IDENTIFICATION SYSTEM

(75) Inventors: Jie Tan, Beijing (CN); Zhiyuan Zhu, Beijing (CN); Hongsheng Zhao, Beijing (CN)

(73) Assignee: Chinese Academy of Sciences Institute of Automation, Beijing (CN)

( * ) Notice: Subject to any disclaimer, the term of this patent is extended or adjusted under 35 U.S.C. 154(b) by 162 days.

(21) Appl. No.: 13/143,041

(22) PCT Filed: Dec. 16, 2010

(86) PCT No.: PCT/CN2010/002054
§ 371 (c)(1),
(2), (4) Date: Jun. 30, 2011

(87) PCT Pub. No.: WO2011/072486
PCT Pub. Date: Jun. 23, 2011

(65) Prior Publication Data
US 2011/0266344 A1     Nov. 3, 2011

(30) Foreign Application Priority Data
Dec. 16, 2009   (CN) .......................... 2009 1 0242749

(51) Int. Cl.
*G06K 7/00* (2006.01)
(52) U.S. Cl.
USPC ......................................... 235/438; 235/492

(58) Field of Classification Search
USPC ................ 235/438, 492, 449, 472.02, 462.46
See application file for complete search history.

(56) References Cited

U.S. PATENT DOCUMENTS

| 6,104,291 | A | 8/2000 | Beauvillier et al. | |
| 7,306,162 | B2 * | 12/2007 | Forster | 235/492 |
| 7,528,712 | B2 * | 5/2009 | Hong et al. | 340/514 |

FOREIGN PATENT DOCUMENTS

| CN | 2781361 | 5/2006 |
| CN | 101777136 | 7/2010 |

* cited by examiner

*Primary Examiner* — Daniel St. Cyr
(74) *Attorney, Agent, or Firm* — Michael J. Donohue; Davis Wright Tremaine LLP

(57) ABSTRACT

An apparatus for testing the performance of Radio Frequency Identification (RFID) system, comprising:
a drive motor, that is driven according to a preset speed;
a turntable, that is fixed on to a plane of drive motor, said turntable including a gadget to fasten the label, the gadget makes the under-test label perpendicular to the plane and rotates with the turntable;
a reader antenna, that is set to a fixed position around the turntable and connected to the under-test reader, wherein direction of main lobe axes of the reader antenna and direction of the main lobe axes of antenna built in the under-test label are in the same plane.
The present invention utilizes circular motion in the lab to simulate rectilinear motion in the practical application. The present invention reduces the volume of RFID test device and the space in the lab, and improves the flexibility of the test.

14 Claims, 5 Drawing Sheets

METHOD AND APPARATUS FOR TESTING THE PERFORMANCE OF RADIO FREQUENCY IDENTIFICATION SYSTEM

This application is the United States National Phase of International Application PCT/CN2010/002054, filed Dec. 16, 2010. This application also includes a claim of priority to Chinese Application No. 200910242749.6 filed Dec. 16, 2009.

FIELD OF THE INVENTION

The present invention relates to radio frequency technology in electronics industry, and more specifically to method and apparatus for testing the performance of Radio Frequency Identification (RFID) system

BACKGROUND OF THE INVENTION

Radio Frequency Identification (RFID) is well used in the non-contact automatic identification technology. It has merits such as the label being small and reusable, quick read-write speed, high recognition rate, long recognition distance and huge storage. Besides, RFID can identify multiple moving targets simultaneously. Combination of Internet and RFID technology can realize the tracking and management of goods all over the world. RFID has already been widely used in different areas such as: intelligent transportation, logistics management, safety certification, real-time location and so on. It improves the efficiency of production and management, and reduces the cost.

RFID is the core technology for internet of things, which is developing rapidly. The number of related products manufacturers increased gradually. There are a great variety of RFID products in the market. Therefore it is important to test the performance of RFID products in order to choose the best product by users which can meets their needs.

There is a common feature in many RFID application scenarios that the distance between a reader and a tag is constantly changing, and the speed of changing can't be predicted. So, testing is necessary for RFID system in dynamic scenarios.

The purpose of benchmarks is to test the performance of a class of objects by designed testing methods and tools, and ensuring that obtained testing results are comparable, and repeatable. Testing of the performance of RFID system in dynamic scenarios can reflect the performance for RFID applications system in real state.

The inventor realized that there is some shortcomings in existing test way for RFID technology. It is difficult to build dynamic test scenarios because such scenarios need to occupy a big venue. Besides, the implementation of these experiments is challenging. Operators are required to conduct the same experiment multiple times at the same conditions. That means that an operator with some RFID tags must tries to walk passing an antenna in the same way and at the same speed over and over again.

SUMMARY OF THE INVENTION

Subject of the present invention is to provide method and apparatus for testing the performance of Radio Frequency Identification (RFID) system, that can save space of the test environment, reduce the volume of test equipment.

According to one aspect of the present invention, an apparatus for testing the performance of Radio Frequency Identification (RFID) system, comprising:

a drive motor, that is driven according to a preset speed;

a turntable, that is fixed on to a plane of drive motor, said turntable including a gadget to fasten the label, the gadget makes the under-test label perpendicular to the plane and rotates with the turntable;

a reader antenna, that is set to a fixed position around the turntable and connected to the under-test reader, wherein direction of main lobe axes of the reader antenna and direction of the main lobe axes of antenna built in the under-test label are in the same plane.

According to another aspect of the present invention, a method for testing the RFID system, comprising the steps of:

a drive motor works at a preset speed;

turntable is fixed on to the plane of drive motor, said turntable including a gadget to fasten the label, the gadget makes the under-test label perpendicular to the plane and rotates with the turntable;

when direction of main lobe axes of reader antenna and direction of main lobe axes of antenna built in the under-test label are parallel or in the same plane, under-test reader sends commands to the reader antennas; said reader antennas is fixed around turntable, and send signals for reading the label at the same time interval.

The present invention utilizes circular motion in the label to simulate rectilinear motion in the practical application. That reducing the volume of RFID test devices and the space in the lab, improves the flexibility of the test.

DETAILED DESCRIPTION OF THE INVENTION

Figure 1:
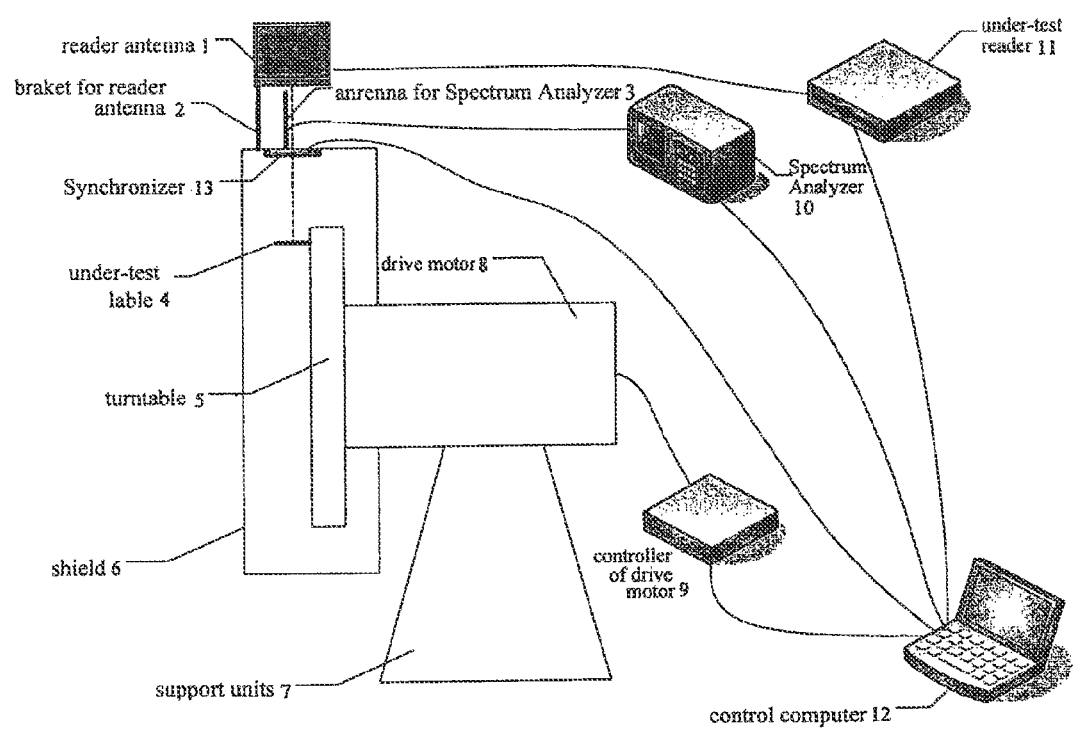
FIG. 1 is a schematic illustrating the apparatus in testing the performance of RFID system.

To reach the purpose, technical solutions and advantages of present invention be understood more clearly, further details of the invention are described as follow:

In order to restore the real scenarios in the test process, the present invention provides method and apparatus for testing the performance of Radio Frequency Identification (RFID) system.

According to the present invention, the apparatus for testing the performance of RFID system comprises: a drive motor, that is driven according to a preset speed; a turntable, that is fixed on to the plane of drive motor, including a gadget to fasten an under-test label, the gadget makes the under-test label perpendicular to the plane; a reader antenna is set to a fixed position around the turntable and connected to the under-test reader. Direction of main lobe axes of reader antenna and direction of main lobe axes of an antenna built in the label (referred to label antenna) are in the same plane.

When the direction of main lobe axes of reader antenna and direction of main lobe axes of a antenna built in the label are parallel or in the same plane, the reader sends commands for reading the label at the same time interval through the reader antenna. The present invention utilizes circular motion in the label to simulate rectilinear motion in the practical application. In this way the invention reduces the volume of RFID test devices and the space in the lab, and improves the flexibility of the test.

Preferably, the apparatus further comprises a spectrum analyzer and an antenna of the spectrum analyzer. The spectrum analyzer captures and demodulates these electromagnetic signals in trigger mode. The antenna of spectrum analyzer is connected to spectrum analyzer, and located in the middle of reader antenna and label antenna. In fact, the antenna of spectrum analyzer can be located on anywhere around the turntable, as long as it can monitor the communication process between the reader antennas and label. The optimal position is given in this embodiment, so the antenna of spectrum analyzer can receive the strongest signal. The gain for antenna of spectrum analyzer is equal or greater than 2 dBi, and the gain for reader antenna is equal or greater than 10 dBi.

In this embodiment, a lower gain, a dual dipole antenna with symmetrical pattern as a receiving antenna can reduce the interference coupling. With gain more than 10 dBi the use of this antenna can improve the ability to distinguish weak signals.

Preferably, the apparatus further comprises a controller of drive motor, a control computer. The controller of drive motor, the reader and spectrum analyzer are all connected to the control computer which sends commands to the controller of drive motor for speed controlling and also sends commands to the reader for reading the label at the same time interval. Spectrum analyzer is triggered in the main channel of under-test reader, and the spectrum analyzer monitors the communication process between the reader and label by capturing these electromagnetic signals of the communication process. Besides, spectrum analyzer will demodulate these captured electromagnetic signals and record the results. Then, a statistical analysis was made of the results by control computer. The above-mentioned devices form a test system for RFID, and it is easy to test the performance of the RFID application system.

Preferably, the apparatus further comprises a synchronizer which is fixed in the shield to detect whether the under-test label is in the work area of reader antenna, then the detected result will be sent to control computer. The control computer will record intervals of two entrance of label in the work area of reader antenna, and sends read commands to the reader, then the reader sends commands to the reader antennas at the same interval. The reader antenna is fixed around turntable and sends signals for reading the label at the same time. The synchronizer is located in the same plane with RFID label and in the middle of reader antenna and label antenna. The synchronizer is a high precision optical sensor, and will improve testing efficiency.

Preferably, the conductivity of materials for the turntable and gadget to fasten the under-test label is very low. Dielectric constant of this material is less than 1.5. An RF metallic shield with absorbing material attached is installed outside the turntable. The reader communicates with label through the window in the shield. The plane of the window in the shield and main lobe axes of reader antenna lie at an angle of 45 degrees. The shield improves the accuracy and security for the test. Absorbing material is used to prevent the electromagnetic interference from shield.

The present invention will be better understood and appreciated in conjunction with the following detailed description of exemplary embodiments taken together with the accompanying drawings.

FIG. 1 is a schematic illustrating the apparatus in testing the performance of RFID system; the present invention utilizes circular motion in the label to simulate rectilinear motion in the practical application. The apparatus comprises: a reader antenna 1, a bracket 2 for reader antenna, an antenna 3 for spectrum analyzer, an under-test label 4, a turntable 5 a shield 6 a support unit 7 a drive motor 8, a controller 9 of drive motor, a spectrum analyzer 10, an under-test reader 11, a control computer 12, a synchronizer 13. The reader antenna 1 is set on the bracket 2 for reader antenna. The antenna 3 for spectrum analyzer is set on the shield 6. The under-test label 4 is fixed on the turntable 5. The antenna 3 for spectrum analyzer is located in the middle of reader antenna 1 and under-test label 4. The synchronizer 13 is fixed in the shield 6, just below the antenna 3 for spectrum analyzer. The turntable 5 is installed on the drive motor 8, and the turntable 5 and under-test label 4 lie in the shield 6. The shield 6 and drive motor 8 are all installed on support unit 7. The reader antenna 1 and under-test reader 11, antenna 3 for spectrum analyzer and spectrum analyzer 10 are all connected by RF feeder respectively. The synchronizer 13 and controller 9 of drive motor are connected to the control computer 12 by signal feeder. The control computer 12 sends commands to the controller 9 of drive motor for speed controlling, and makes sure the under-test label 4 moves at a preset speed. The synchronizer 13 will send a message to the control computer 12 if the under-test label 4 has entered into the work area of the reader antenna. The control computer 12 will record interval of two entrances, and then the under-test reader 11 sends commands to the reader antennas 1 at the same interval. The reader antenna 1 is fixed around turntable and sends signals for reading the under-test label 4 at the same time. The spectrum analyzer 10 is triggered in the main channel of the under-test reader 11, and monitors the communication process between the under-test reader 11 and under-test label 4 by capturing electromagnetic signals of the communication process. The spectrum analyzer 10 demodulates these signals and records the results. If the number of correctly demodulated signals is less than 100, the spectrum analyzer 10 captures these electromagnetic signals of the communication process continuously. If the velocity of under-test label 4 has changed, begin a new test.

Figure 2A:
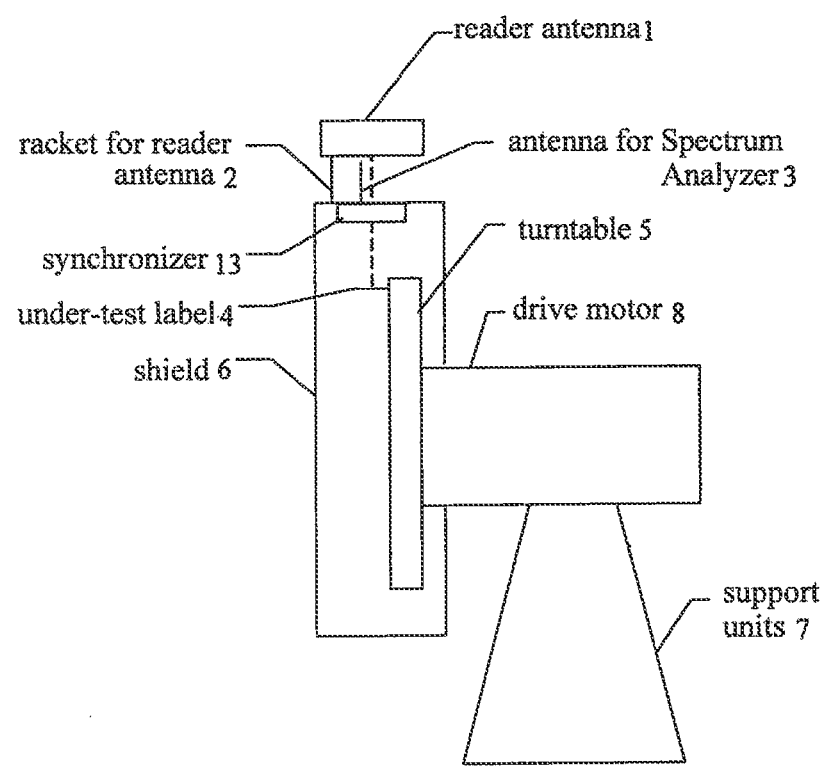
FIG. 2a is a front view illustrating the apparatus in testing the performance of RFID system.
Figure 2B:
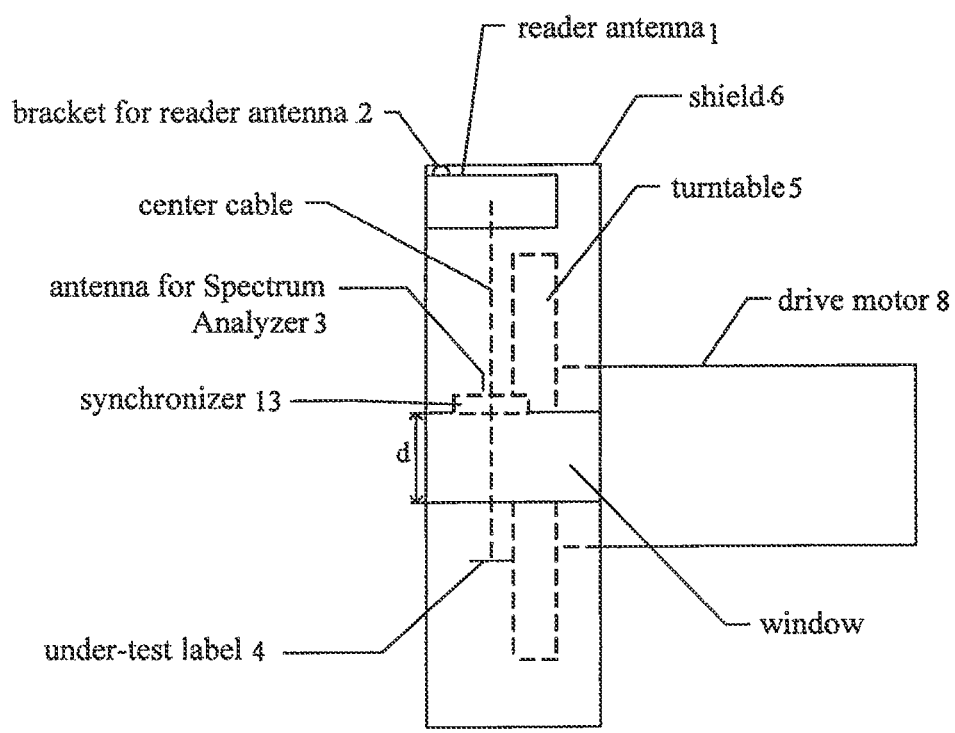
FIG. 2b is a top view illustrating the apparatus in testing the performance of RFID system.
Figure 2C:
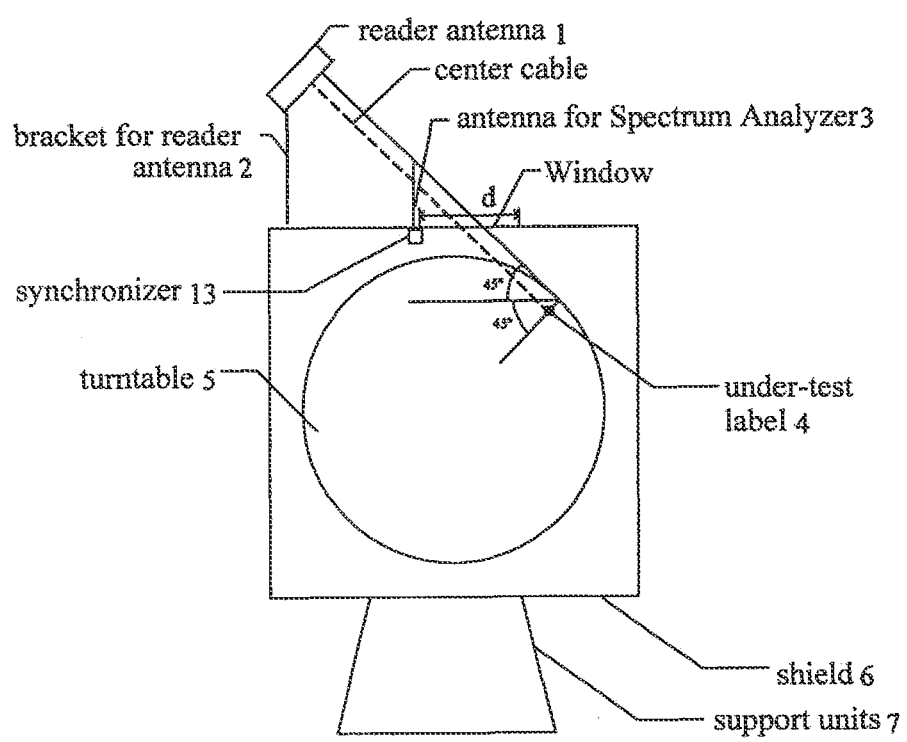
FIG. 2c is a left view illustrating the apparatus in testing the performance of RFID system.

FIG. 2a is a front view illustrating the apparatus in testing the performance of RFID system; FIG. 2b is a top view illustrating the apparatus in testing the performance of RFID system; FIG. 2c is a left view illustrating the apparatus in testing the performance of RFID system; As shown in the FIG. 2a, FIG. 2b, FIG. 2c, in the rotation system in the test system, a reader antenna 1 is set on a bracket 2 for a reader antenna; an antenna 3 for spectrum analyzer is set on a shield 6; an under-test label 4 is fixed on a turntable 5; an antenna 3 for spectrum analyzer is located in the middle of the reader antenna 1 and under-test label 4; a synchronizer 13 is fixed in the shield 6, just below the antenna 3 for spectrum analyzer; the turntable 5 is installed on a drive motor 8; the turntable 5 and under-test label 4 are lie in the shield 6; the shield 6 and drive motor 8 are all installed on a support unit 7; An under-test reader 11 communicates with the under-test label 4 through the window in the shield 6. The plane of the window in the shield 6 and main lobe axes of reader antenna 1 lie at an angle of 45 degrees.

In one embodiment of the present invention, with absorbing material wrapped, the bracket 2 for the reader antenna is made of polystyrene material, and it is 0.3 meters high. The reader antenna 1 is set on the bracket 2 for reader antenna. The antenna 3 for spectrum analyzer is 0.3 meters away from the bracket 2 for reader antenna. The antenna 3 for spectrum analyzer is close to the window. The spectrum analyzer 10 is Tektronix RSA3308B real-time spectrum analyzer. The control computer 12 is a common computer with a LAN interface, and is connected to spectrum analyzer 10 and under-test reader 11 through 1000 Mbps Ethernet switch.

The turntable 5 is a 60 cm-diameter plastic disc, and dielectric constant of this material is less than 1.5. The steel shield 6 is size 80 cm×80 cm×10 cm.

Figure 3:
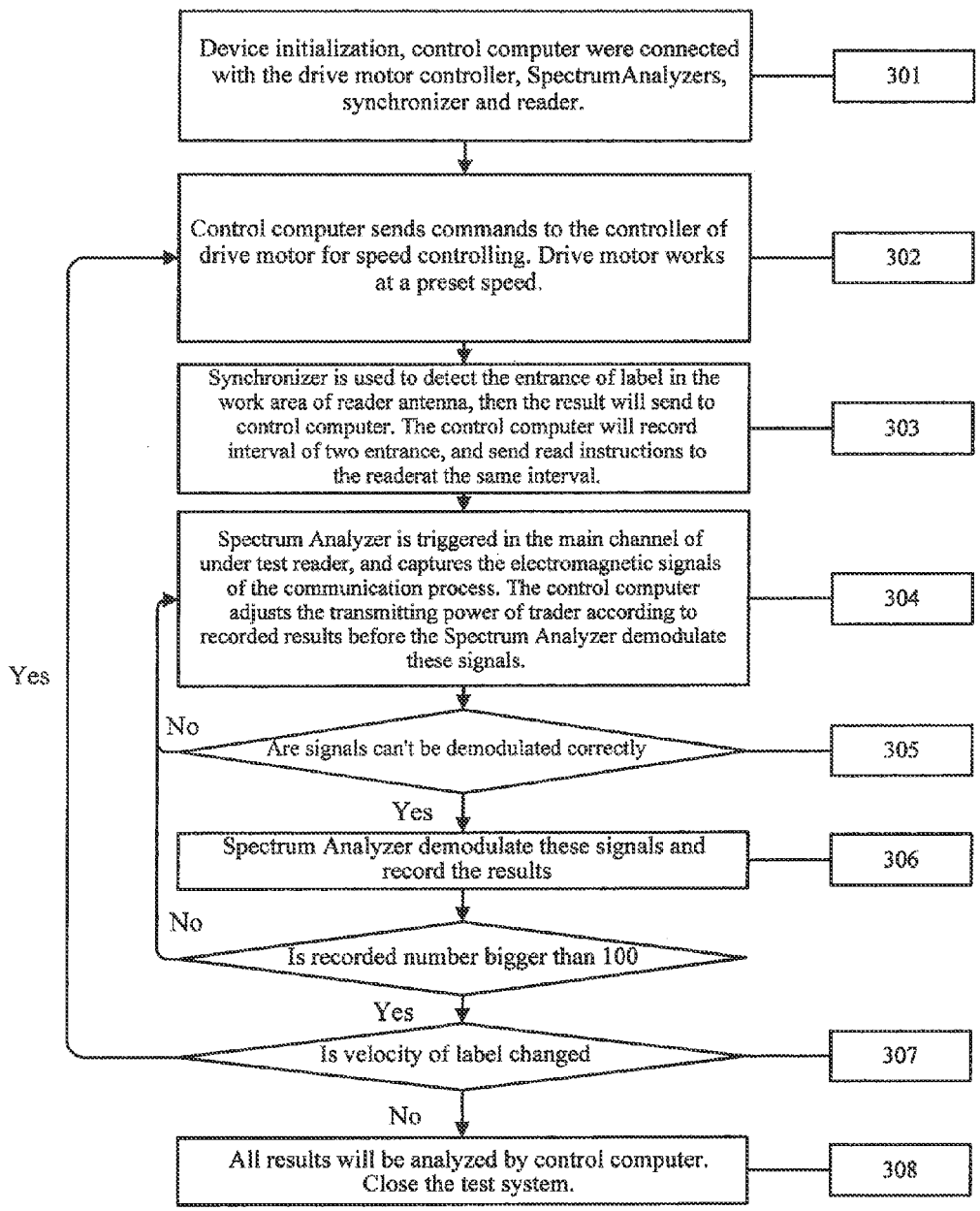
FIG. 3 is a flow diagram illustrating a method in testing the performance of RFID system.

FIG. 3 is a flow diagram for method in testing the performance of RFID system. A method for testing the RFID system using this apparatus, comprising the steps of:

Step 301, Device initialization, a control computer 12 is connected with a drive motor controller 9, a spectrum analyzers 10, a synchronizer 13 and an under-test reader 11. All equipments are ready for work.

Step 302, velocity of the under-test label 4 is set to V on the control computer 12. The control computer 12 sends commands to the drive motor controller 9 for speed controlling. The under-test label 4 moves at a preset speed V, wherein V=2πRn/60, R is the distance from the center of turntable 5 to the location of the under-test label 4. In this embodiment, R=30 cm V=30 km/h, n is the rotational velocity of drive motor 8 per minute, the maximum value of n is 2000 laps/min. A transmitting power of the under-test reader 11 is set to be maximum that is permitted in this area, such as the maximum transmitting power is 2 W ERP in China.

Step 303, a synchronizer 13 is fixed in the shield 6 to detect whether the under-test label 4 is in the work area of the reader antenna. And then the detected result will be sent to the control computer 12. The control computer 12 will record interval T of two entrance of under-test label 4 in the work area of reader antenna 1, and sends read commands to the under-test reader 11. And then the under-test reader 11 sends commands to the reader antennas 1 at the same interval. The reader antennas 1 is fixed around turntable 5 and sends signals for reading the under-test label 4 at the same time.

Step 304, the antenna 3 for spectrum analyzer is connected to spectrum analyzer 10, and located in the middle of reader antenna 1 and under-test label 4. The spectrum analyzer 10 is triggered in the main channel, and a frequency point of the under-test reader is $f_c$=920.125 MHz, and the spectrum analyzer 10 captures these electromagnetic signals of the communication process. To make sure the power of reading signals arrived to the under-test label 4 is the same, the control computer 12 adjusts the transmitting power of reader according to recorded results before the Spectrum Analyzer 10 demodulates these signals. The adjusted transmitting power of under-test reader 11 is:

$$P_T = P_R + 20 \lg\left(\frac{4\pi D}{\lambda}\right) - G_R - G_T$$

Wherein said: $P_R$ is the amplitude of the transmitting power in the location of antenna for spectrum analyzer; D is the distance between antennas 11 for under-test reader and spectrum analyzer 10, it is 0.4 m in this case; λ is the wavelength of transmitting signals, $\lambda=c/f_c$, $f_c$ is the work frequency in the main channel; $G_R$ is the gain of receiving antenna of the spectrum analyzer; $G_T$ is the gain of transmitting antenna for reader, $G_R$=2.3 dBi $G_T$=10 dBi in this case.

Step 305, if these signals can't be demodulated correctly, back to step 304. Or else go into Step 306.

Step 306, the spectrum analyzer 10 demodulates these signals and records the results. If the number of correctly demodulated signals is less than 100, back to step 304. Or else go into Step 307.

Step 307, if the velocity V for the under-test label 4 has changed, back to step 302. Or else go into Step 308.

Step 308, All results will be analyzed by control computer 12. Close the test system.

Advantageous effects for the present invention comprising:

1) The present invention utilizes circular motion in the label to simulate rectilinear motion in the practical application. It reduces the volume of RFID test devices and takes less time to implement testing compared to the conventional schemes. And also the present invention improves the flexibility of the test.

2) Using lower gain, dual dipole antenna with symmetrical pattern as a receiving antenna can reduce the interference coupling. With gain more than 10 dBi the use of this antenna can improve the ability to distinguish weak signals.

3) A synchronizer is fixed in the shield to detect whether the label is in the work area of reader antenna. The control computer will record interval of two entrance of label in the work area of reader antenna, and sends read commands to the reader, then the reader sends commands to the reader antenna at the same interval. The reader antenna is fixed around turntable and sends signals for reading the label at the same time. That improves testing efficiency.

While the invention has been described in connection with what is presently considered to be the most practical and preferred exemplary embodiments, it is to be understood that the invention is not to be limited to the disclosed embodiments but, on the contrary, is intended to cover all variations, medications and equivalent arrangements included within the scope of the appended claims.

The invention claimed is:

1. An apparatus for testing performance of a Radio Frequency Identification (RFID) system, comprising:
    a drive motor configured to be driven at a preset speed;
    a turntable disk configured to be fixed on a rotating plane of the drive motor, said turntable disk including a gadget to fasten an under-test RFID label in such a way that the under-test RFID label is perpendicular to the plane and rotates with the turntable disk;
    a reader antenna configured to be set in a fixed position around the turntable disk and connected to an under-test reader, wherein direction of main lobe axes of the reader antenna and direction of main lobe axes of an antenna built in the under-test RFID label are in the same plane.

2. The apparatus according to claim 1, further comprising:
    a spectrum analyzer, wherein the spectrum analyzer is configured to captures and demodulates electromagnetic signals in a trigger mode; and
    an antenna of spectrum analyzer configured to be connected to spectrum analyzer and located in the middle of the reader antenna and the antenna built in the under-test label.

3. The apparatus according to claim 2, wherein a gain for the antenna of spectrum analyzer is equal or greater than 2 dBi; and
    a gain for the reader antenna is equal or greater than 10 dBi.

4. The apparatus according to claim 2, further comprising:
    a controller of drive motor and a control computer, wherein;
    said controller of drive motor, said under-test reader, and said spectrum analyzer are all connected configured to be to the control computer;
    the spectrum analyzer is configured to be triggered in a main channel Of the under-test reader, and monitor communication process between the under-test reader and the under-test RFID label by capturing electromagnetic signals of the communication process;

the spectrum analyzer is configured to demodulate these captured electromagnetic signals and records, the results;

the control computer is configured to send commands to the controller of drive motor for speed controlling and send commands to the under-test reader for reading under-test label at a same interval; and a statistical analysis is made of the results by control computer.

5. The apparatus according to claim 4, further comprising:
an RF metallic shield with absorbing material attached and installed outside the turntable disk; wherein
the under-test reader is configured to communicate with the under-test RFID label through a window in the RF metallic shield.

6. The apparatus according to claim 5, wherein a plane of the window in the RF metallic shield and the main lobe axes of the reader antenna lie at an angle of 45 degrees.

7. The apparatus according to claim 5, wherein conductivity of material for the turntable disk and the gadget to fasten the under-test RFID label is very low; and
a dielectric constant of this material is less than 1.5.

8. The apparatus according to claim 5, further comprising:
a synchronizer configured to be fixed in the RF metallic shield to detect whether the under-test RFID label is in a work area of the reader antenna.

9. The apparatus according to claim 8, wherein said synchronizer is an optical sensor.

10. A method for testing the RFID system, comprising the steps of:
setting a drive motor to work at a preset speed;
fixing a turnable disk on a plane of the drive motor, said turntable disk including a gadget to fasten an under-test RFID label in such a way the under-test RFID label is perpendicular to the plane and rotates with the turntable disk; and
when direction of main lobe axes of a reader antenna connected to an under-test reader and direction of main lobe axes of an antenna built in the under-test RFID label are parallel with respect to each other or in a same plane, sending commands from the under-test reader to the reader antenna; said reader antenna being configured to be fixed around the turntable disk and send signals for reading the under-test RFID label at a same time interval.

11. The method according to claim 10, further comprising:
connecting an antenna of spectrum analyzer to a spectrum analyzer, and locating the antenna of spectrum analyzer in middle of the reader antenna and the antenna built in the under-test RFID label;
triggering the spectrum analyzer in a main channel of the under-test reader to capture electromagnetic signals of communication process; and
demodulating by the electromagnetic signals by the spectrum analyzer and record results.

12. The method according to claim 11, wherein
a control computer is configured to send commands to the controller of drive motor for speed controlling;
a synchronizer is configured to be fixed in a shield to detect whether the under-test RFID label is in a work area of the reader antenna, and then the detected results are sent to the control computer;
the control computer is configured to record interval of two entrances of the under-test RFID label in the work area of the reader antenna, and then send read instructions to the under-test reader;
the under-test reader is configured to send commands to the reader antennas at the same interval, and the reader antenna is configured to be fixed around the turntable disk and send signals for reading the under-test RFID label at the same time;
the spectrum analyzer is configured to demodulate these signals and records the results; and
all results are analyzed by the control computer.

13. The method according to claim 11, wherein
the control computer is configured to adjust transmitting power of the under-test reader according to receive signals strength by the spectrum analyzer before the spectrum analyzer demodulates these signals.

14. The method according to claim 13, wherein
adjusted transmitting power of the under-test reader is calculated by following equation:

$$P_T = P_R + 20 \lg\left(\frac{4\pi D}{\lambda}\right) - G_R - G_T,$$

Wherein $P_R$ is an amplitude of the transmitting power in a location of the antenna for spectrum analyzer; D is a distance between the reader antenna and the spectrum analyzer; $\lambda$ is a wavelength of transmitting signals; $G_R$ is a gain of receiving antenna of spectrum analyzer; and $G_T$ is a gain of the reader antenna.

* * * * *